United States Patent [19]

Greiwe et al.

[11] Patent Number: 5,385,465

[45] Date of Patent: Jan. 31, 1995

[54] VERTICLE THERMOFORMING APPARATUS

[76] Inventors: Daniel Greiwe, 344 Sturges, Elmhurst, Ill. 60123; Claude Powell, Rt. 2, Box 43, New London, Mo. 63459; Greg Pranger, 16 King Arthur Ct., Apt. 7, North Lake, Ill. 60164

[21] Appl. No.: 955,114

[22] Filed: Oct. 1, 1992

Related U.S. Application Data

[63] Continuation-in-part of Ser. No. 635,664, Dec. 28, 1990, abandoned.

[51] Int. Cl.⁶ ............................................. B29C 51/00
[52] U.S. Cl. ................................. 425/308; 264/550; 264/553; 425/384; 425/387.1; 425/388; 425/398; 425/437
[58] Field of Search .............. 264/549, 550, 553, 544; 425/383, 384, 385, 387.1, 388, 437, 394, 398, 289, 308

[56] References Cited

U.S. PATENT DOCUMENTS

| | | | |
|---|---|---|---|
| 2,974,366 | 3/1961 | Bauman | 264/544 |
| 3,578,735 | 5/1971 | Holmar et al. | 425/384 |
| 3,673,835 | 7/1972 | Arfert | 425/387.1 |
| 4,423,000 | 12/1983 | Teraoka | 425/388 |
| 4,592,718 | 6/1986 | Teraoka | 425/504 |
| 4,600,376 | 7/1986 | Gillman et al. | 425/388 |
| 4,804,565 | 2/1989 | Rast | 425/405.1 |
| 4,878,826 | 11/1989 | Wendt | 425/388 |
| 4,994,229 | 2/1991 | Flecknoe-Brown | 425/384 |
| 5,135,383 | 8/1992 | Marchesini | 425/387.1 |

*Primary Examiner*—Charles S. Bushey
*Attorney, Agent, or Firm*—Robert E. Brown; Thomas C. McDonough; Mark R. Galis

[57] ABSTRACT

An apparatus for thermoforming plastic sheet material which has a frame and complementary mold halves mounted on the frame for movement toward and away from one another. The apparatus has an indexing means which moves along a vertical path to pull the plastic material through the mold and a clamping means disposed between the mold halves which operates with the mold to clamp the plastic sheet around the edges of the forming tool of one mold half. The indexing means and clamping means operate to reduce sag of the plastic material and improve uniformity of the finished article. Operation of the apparatus is enhanced by the use of air pressure, vacuum and cooling during molding and release.

16 Claims, 8 Drawing Sheets

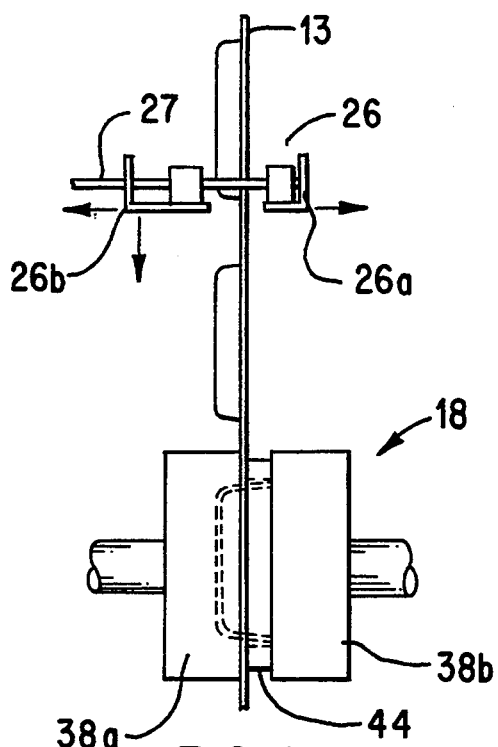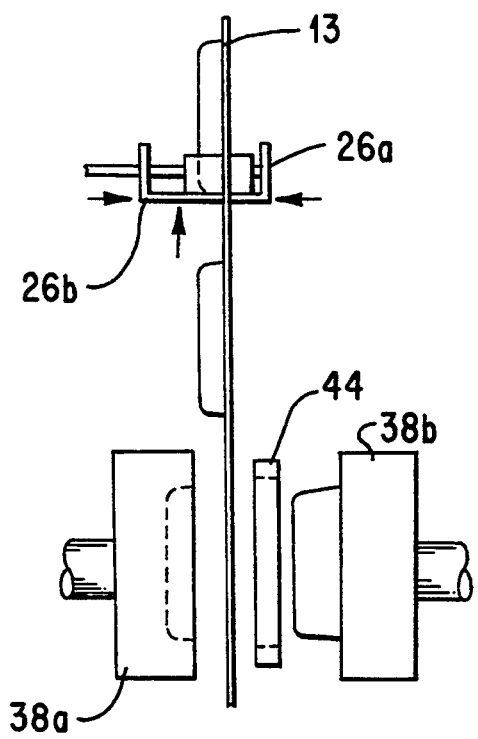
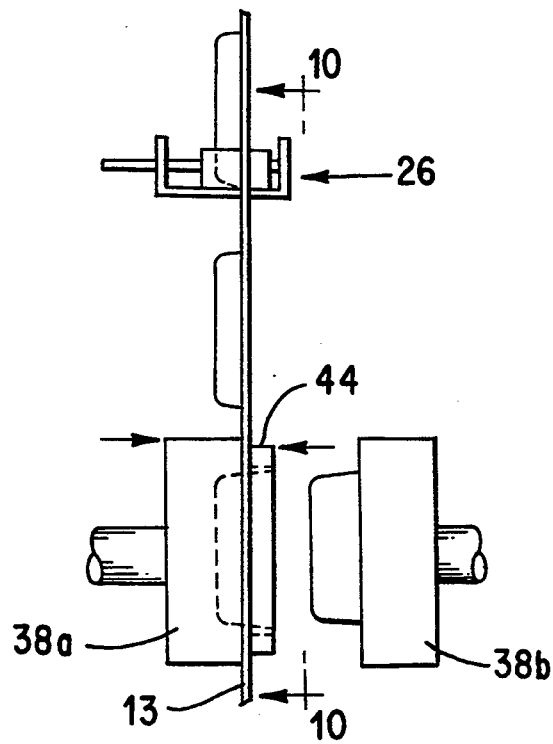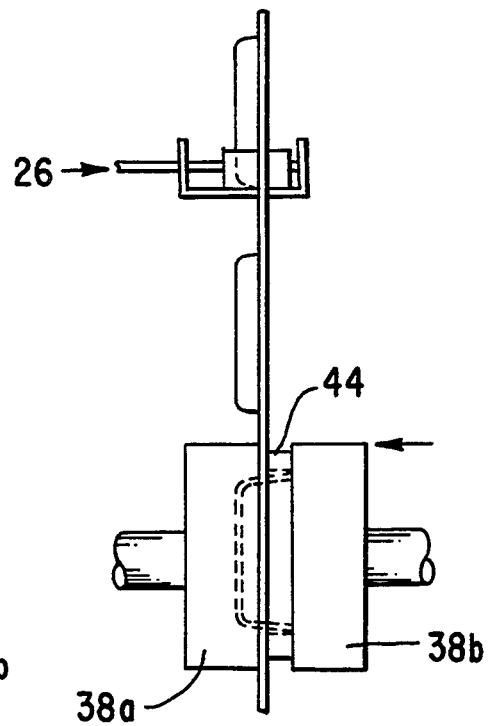

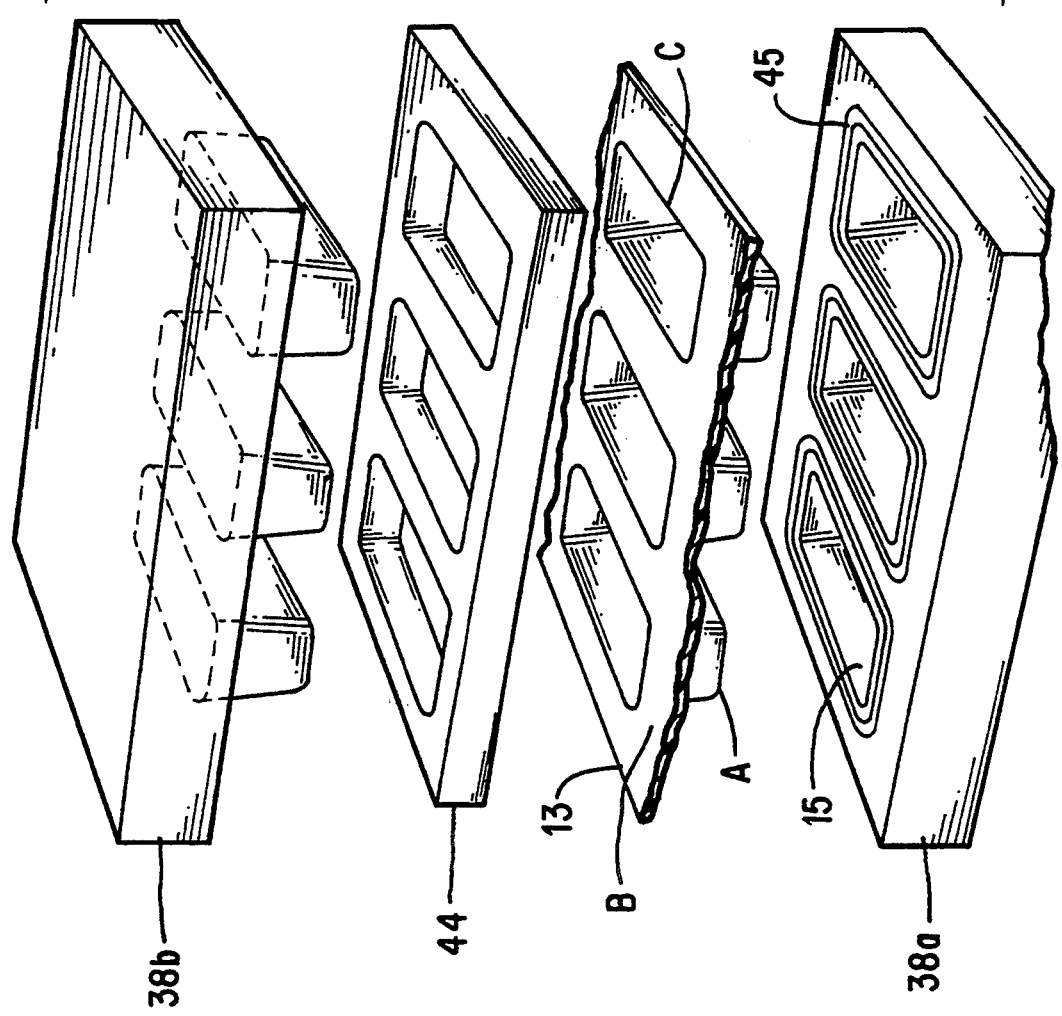

VERTICLE THERMOFORMING APPARATUS

This is a continuation-in-part of application Ser. No. 07/635,664 filed Dec. 28, 1990, now abandoned.

BACKGROUND OF THE INVENTION

This invention relates to an apparatus for manufacturing containers, lids and other plastic items by thermoforming a plastic sheet material on a continuous run basis. It relates in particular to small, relatively high-volume machines which operate using molds of single or few cavities.

In general, in thermoforming processes, a sheet of thermoplastic material is carried across one-half of a mold. The thermoplastic sheet is heated, and at a specific time, the other half of the mold is inserted into the first half at considerable pressure to form the desired shape in the thermoplastic sheet. This process may be assisted by a vacuum on one side and pressure on the other to maintain the configuration of the mold and by cooling. It has been known to use large molds, which are usually multi-cavity for molds of small parts. Smaller molds are generally single-cavity or have relatively few cavities. In general, thermoforming machines have been increasing in size in an attempt to lower unit manufacturing costs. While this is satisfactory for an extremely high-volume operation, it is not satisfactory for a lower volume operation or thermoforming job.

The basic difficulty with building a small thermoforming machine using smaller molds is that the unit consumption of thermoplastic material increases as the mold is decreased in size. This is because most thermoforming machines carry the thermoplastic material through the machine and across the mold by a chainpin system which grips the thermoplastic material on each side of the sheet. A chainpin generally punctures the material one-quarter to one-half inch in from the edge, consuming three-quarters to one inch on each side of the sheet, which is trim scrap and is waste in the manufacturing process. Given a total sheet width of thirty inches on a standard thermoplastic material roll, one and one-half-inch total waste is approximately five percent of the material. However, with a small mold and a ten-inch sheet width, the same amount of waste increases to fifteen percent of the total. In addition, since present thermoforming machines run the sheet of thermoplastic material through the mold horizontally, the material must be held on the edges with the chainpin. Since the material is heated, as noted above, it becomes soft and pliable after passing through the radiant heaters and thus begins to sag as it is carried into the forming station. Sagging creates problems known in the trade as "bridging", "webbing", "thinning" and "dragging" which result in thin walls in various spots in the molded item, premature cooling of other spots and lower overall quality of the finished product.

Another present process exists which does not use chainpins as material carriers. This is a contact heat thermoformer wherein the material is heated in the actual forming station, where it is held while being heated on a flat-bottom plate. This process works well with specific plastics which are heavily oriented and shrink when they are heated. The process has the distinct limitations of being only feasible for running on female molds, and it cannot be plug-assisted due to the required flat heating plate. Speeds are also limited somewhat in that the material must be heated when it is in the forming station, although initial pre-heating can be done. These machines are generally used for very low profile containers such as thin-gauge, high-volume food trays and pill and tablet packs for pharmaceuticals. The greatest limitation in this method is the lack of plug-assisting, which limits these machines to shallow and very simple parts. As noted above, the contact thermoforming machine is used extensively for forming oriented polystyrene (OPS) which has a tremendous orientation, i.e., it tends to shrink when heated.

A final apparatus which is presently in use is called the cap-press machine. These machines, which are constructed in Holland, are specifically used to thermoform caps for round containers, using 0.01 to 0.015 polyvinyl-chloride (PVC). Such machines feed the material vertically from top to bottom, eliminating the need for the chainpin. These machines, however, are cam-driven, which minimizes their adjustability and versatility. In addition, due to the fixed cam cycle, it is not possible to obtain a plug-assist on such machines. This machine also requires use of a "cut-in-place" method, producing an accurately cut part but requiring very expensive tooling. The machine uses either contact heat or radiant heat in a pre-heat mold.

The object, therefore, of the present invention is to eliminate extensive material waste in connection with thermoforming involving smaller machines with single or multiple cavity mold for use with thermoplastic material sheets. It is also an object of this invention to move the thermoplastic sheet through the forming station in a manner so as to retard sagging and other problems such as bridging, webbing, thinning and dragging over the mold. A further object of this invention is to produce an apparatus having the ability to be plug-assisted to produce a variety of thermoformed objects. Another object of the invention is to produce a thermoforming apparatus capable of obtaining a relatively high speed for the size of the machine with greatly improved control of the process. A further object is to produce a thermoforming machine which can be used effectively with small and relatively inexpensive tooling, and which is adjustable to fit various sizes of tooling and different sizes of thermoplastic sheet materials. A further object of the invention is to be able to clamp closely around each mold cavity to control quality and minimize the material consumed. Another object of the invention is to produce an apparatus having a clamping mechanism which can remain in position while the sheet is indexed past it to allow for a relatively inexpensive clamp mechanism that is merely mounted to the machine and has no moveable parts to it.

SUMMARY OF THE INVENTION

The apparatus disclosed and claimed in the present application overcomes many of the disadvantages of the prior art machines. It provides for a small, high-speed thermoforming apparatus and minimizes waste of material. It also permits the use of plug-assisting, and reduces material sagging, thus producing quality thermoformed products.

The apparatus of the present invention vertically feeds a thermoplastic material from a roll through a pre-heating station to a forming station, which may consist of a mold having a single-cavity or multiple-cavities or forming tools. The plastic sheet is moved through the apparatus by a horizontal gripping jaw located above the forming station that grips the sheet across its width and raises it upwardly from the bottom toward the top of the machine. The gripping jaw completely eliminates the side chainpin system and substantially reduces the material waste inherent in such mechanisms.

The gripping jaw moves the material into a forming station where a peripheral cavity clamping tool acts to grip the material around the edges of each molding cavity or forming tool and locks in each cavity for uniformity. The clamping mechanism can remain in position while the sheet is indexed past it due to the fact the sheet does not sag into this part, as it does in the horizontal chair mechanisms. This allows for a relatively inexpensive clamp mechanism that is merely mounted to the machine and has no moveable parts to it.

At the forming station, each mold cavity or forming tool is isolated so that each part is formed independently of the other parts. Single cavity clamping is a preferred feature of the present invention, as it allows a high degree of control and, therefore, quality, and in many cases, further decreases material consumption. Material consumption is reduced because female and male forming tools can be spaced more closely than on conventional machines and because adjacent cavities or forming tools do not interact with each other after they have been isolated by the clamping tool.

With the clamping tool in place, the thermoplastic material is drawn into the cavity. This drawing may be assisted by a combination of vacuum, air pressure, and male or female plugs or rings as the case may be. In addition, cooling may be applied at the forming station to quickly form the part and create a better quality final product.

The vertical forming capability of this machine means that the pre-heating station can use contact heaters. The plastic is sandwiched between the heaters as they open and close during each cycle, allowing for a more efficient transfer of heat. Sensing means assure a very accurate control of the heat level. Accurate heat control is an important factor in increased speed because for every BTU of heat that is put into the plastic beyond what is needed to make the plastic formable, additional time must be allowed in the cooling cycle to dissipate that heat to obtain a rigid state. In addition, zone control on contact heaters is much more effective than attempts to control the radiant heaters used on chain-fed horizontal thermoforming machines.

The present invention may also include an automatic speed-up function to provide the highest possible machine speed automatically, rather than by operator control. During the operation of the machine, speed of a cycle is governed by the heating and cooling time of the formed part. Both of these factors are controlled by heater and mold temperatures and the delay time as the machine stops to allow cooling. It is possible, by trial and error, to lower the dwell time and adjust the heater temperatures and cooling mold temperatures to obtain an optimum speed. The present invention may include infrared sensors which measure the cooled or ejected part and a contact sensor which measures the heated material. Thus, since these temperatures are known and may be controlled by a micro-processor, the delay time may be incrementally lowered to the most efficient point.

The forming station includes a forming press which operates either hydraulically or mechanically. The mechanical method includes the use of a servo motor and ballscrew. The servo motor and ballscrew system allows better control of platen speed and position, as well as an infinitely adjustable press shut height. The servo motor and ballscrew system is programmed so that when a new job is set up, the two mold halves move at a slow speed to the clamp bar mechanism at which time it hits, builds up a pre-calculated pressure and stops. This setting is then recorded and the mold means open. The machine is now ready to operate at high speed returning to this same precise position time after time.

Another feature of the apparatus is high-pressure forming. Most thermoforming presses are built to operate at about thirty (30) pounds per square inch (PSI). This apparatus will go as high as a hundred (100) PSI. Higher forming pressures allow the forming of plastic at lower temperatures, meaning quicker cooling and higher operational speeds. The cutting station is not included as a part of this forming apparatus, as it is in some thermoforming machines. Prior art machines usually steel rule die cut at high speeds, with the die cut directly in-line with the forming station while the material is still trapped in the chain web. The index stroke is critical to the accuracy of the cut, i.e., any misplacement or misalignment of the thermoformed parts due to the forming results in an inaccurate cut.

To the contrary, the cutting station used in this apparatus may be independent from the forming station. Specifically, the cutting station may be fed a web of joined thermoformed parts which are removed from the forming station by an accumulation loop containing an excess number of uncut thermoformed parts. The parts are realigned in the cutting station, using a male plug to align the part under a cutting die. Thus, any misalignment due to the forming is corrected after the piece goes through the accumulation loop and is realigned at the cutting station.

In summary, the unique invention represented by this machine uses vertical feeding of material into a forming station in which the material is isolated over the forming tool by a unique material clamping means. Vertical feeding eliminates material sag which occurs in horizontal feed machines and minimizes related forming problems. The lack of sag allows easy and effective clamping around each forming tool or cavity of the mold, thereby producing more uniform parts, i.e. high quality with less material because of smaller required spacing between parts.

Moreover, the absence of side chain pin feed allows for the elimination of a complete tooling package which normally has to fit between the chain rails down to the movable platen. This is usually either a high cost custom tool package or a stock package which requires additional materials. This invention, therefore, allows for lower cost tooling and/or lower material consumption.

Finally, the absence of a chain pin feed allows contact heating which results in faster heating of the thermoplastic with greater control to increase the speed and efficiency of the operation.

DESCRIPTION OF THE DRAWINGS

The subject invention will be described in relation to several views in the drawings wherein.

FIG. 5 is a series of elevation views of the sequential operation of the forming station wherein:

FIG. 5a shows the forming station open and the indexer gripping the thermoplastic sheet to begin an upward pull.

FIG. 5b shows the indexer in its upper position with the sheet in the forming station.

FIG. 5c shows the clamping ring being brought adjacent the sheet and the mold cavity.

FIG. 5d shows the mold halves being brought together.

FIG. 6 is a representative type of thermoformed object manufactured in accordance with the present invention showing a mold having a cavity forming tool below it and a clamping means above it;

DETAILED DESCRIPTION OF THE DRAWINGS

Figure 1:
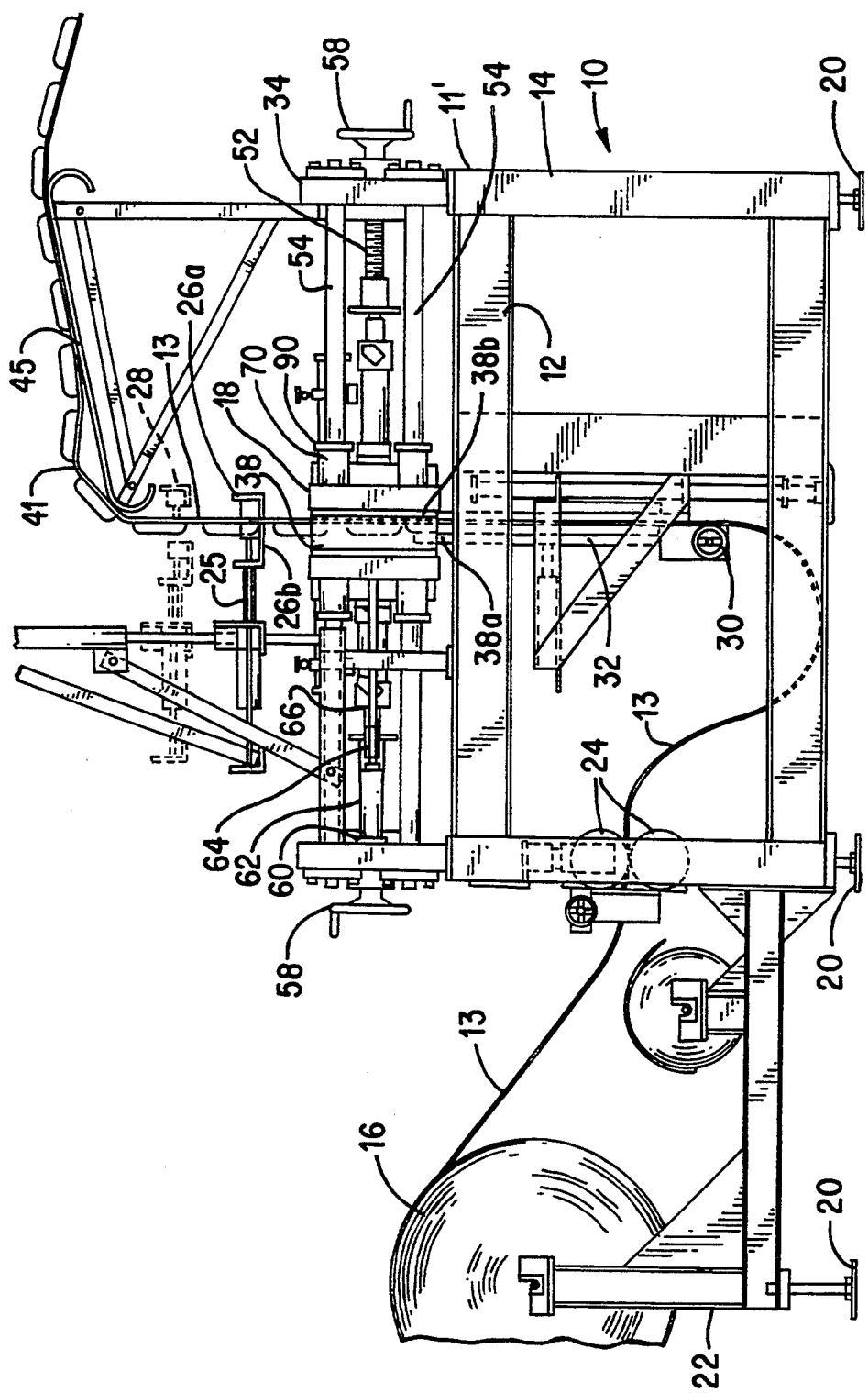
FIG. 1 shows a side elevational view of the overall thermoforming apparatus of the present invention.

Referring now to the drawings, particularly FIG. 1, there is shown a thermoforming apparatus 10 according to the present invention, having a lower frame 11 and an upper frame 34. The lower frame is comprised of horizontal beams 12 and vertical beams 14. The lower frame is supported by adjustable leveling feet 20. Plastic supply means 16 is supported by plastic roll support 22 and supplies a continuous sheet of thermoplastic material, such as polyvinylchloride (PVC) 13 through feeder means 24. As plastic sheet 13 enters the inventive apparatus 10, it is moved to a vertical position through the use of sheet guide 30. Feeder means 24 moves in conjunction with sheet guide indexer 26 mounted on an upper frame 34 to form an accumulation loop of plastic sheet below guide 30. Indexer 26 formed of opposing jaws 26a and 26b moves in a reciprocal vertical manner to pull a section of sheet 13 into contact heaters 32, where that portion of sheet 13 is heated to a temperature sufficient for it to be thermoformed. The exact heater temperature would, of course, depend upon the properties of the sheet, such as type of material, thickness, etc. The heaters 32 may include a specially treated silicone surface to promote material release.

The heated plastic sheet 13 is moved from heaters 32 by indexer 26 into press or forming station 18, where it is thermoformed into the desired shape or part 14. The attached thermoformed parts 14 are pulled from press 18 by sheet guide indexer 26, which is shown in its elevated position at 28. The sheet of part 14 is thereafter pushed over ramp 45 toward the cutting station, forming an accumulation loop 41 in between.

Figure 9:
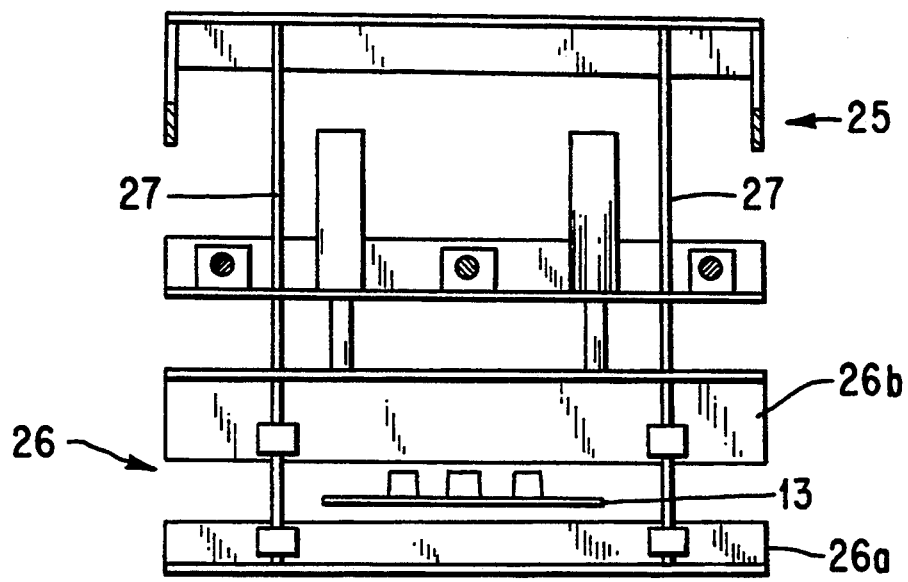
FIG. 9 is a partial plan view showing the sheet guide indexer in open position.
Figure 10:
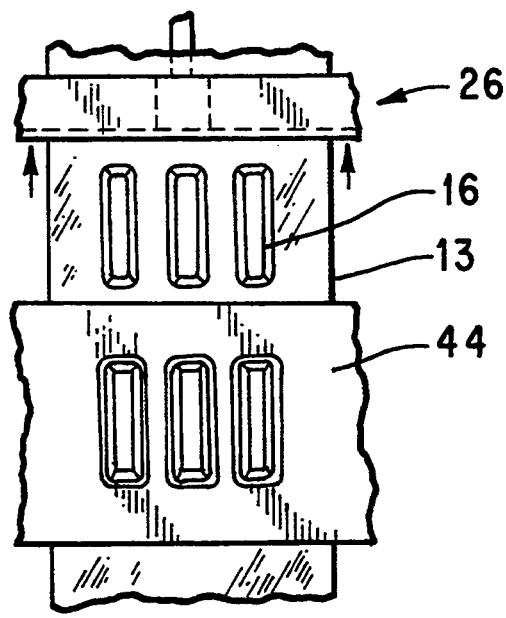
FIG. 10 is a view of the sheet guide indexer.

As can be seen by the shadow lines in FIG. 1, sheet guide indexer 26 moves as a unit vertically in a reciprocal fashion, relative to upper frame 34 pulling the thermoformed sheet 13 in a vertical path up out of the forming station 18. As shown in FIGS. 9 and 10, Jaws 26a and 26b of indexer 26 are mounted on a support area 25 which move vertically on rods 27. The jaws open and close in a horizontal movement in timed relationship to the vertical movement. For example, after indexer 26 pulls a formed section upward out of forming station 18, its jaws open and it moves downwardly to grip and pull a new portion of sheet 13. At the low point of its downward stroke, jaws 26a and 26b close to grip sheet 13 at a point just below the lowermost formed part 14. Movement of jaws may be by pneumatic means controlled by trip and solenoid switches or by computer timed signals.

Figure 2:
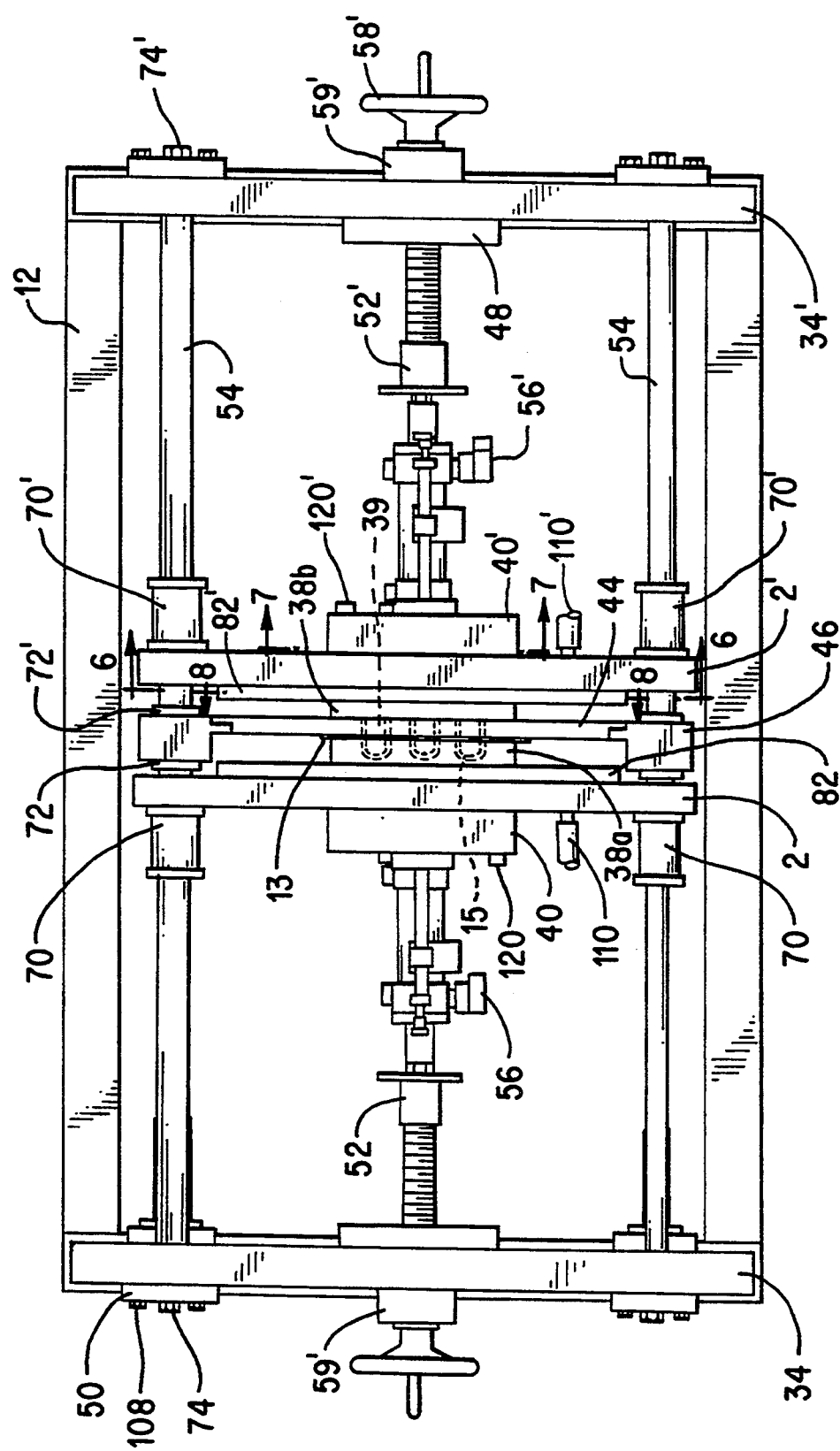
FIG. 2 is a top plan view taken generally along line 2—2 in FIG. 1, showing the forming station of the present invention.
Figure 4:
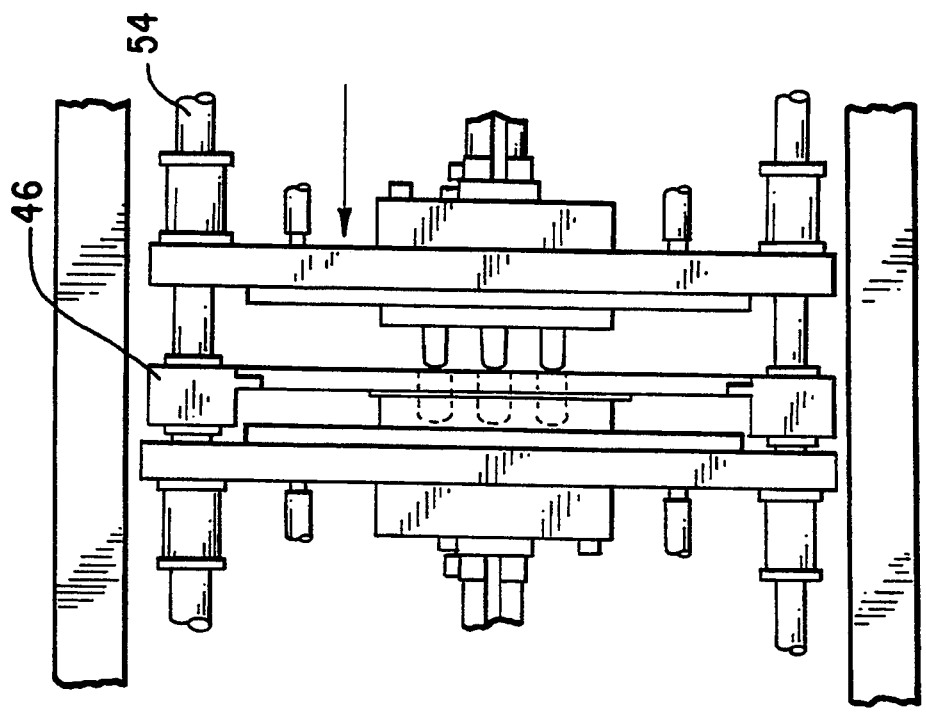
FIG. 4 is a partial plan view of the forming station of the present invention as shown in FIG. 2, showing the retaining or clamping means moved into position over the plastic in the mold.
Figure 3:
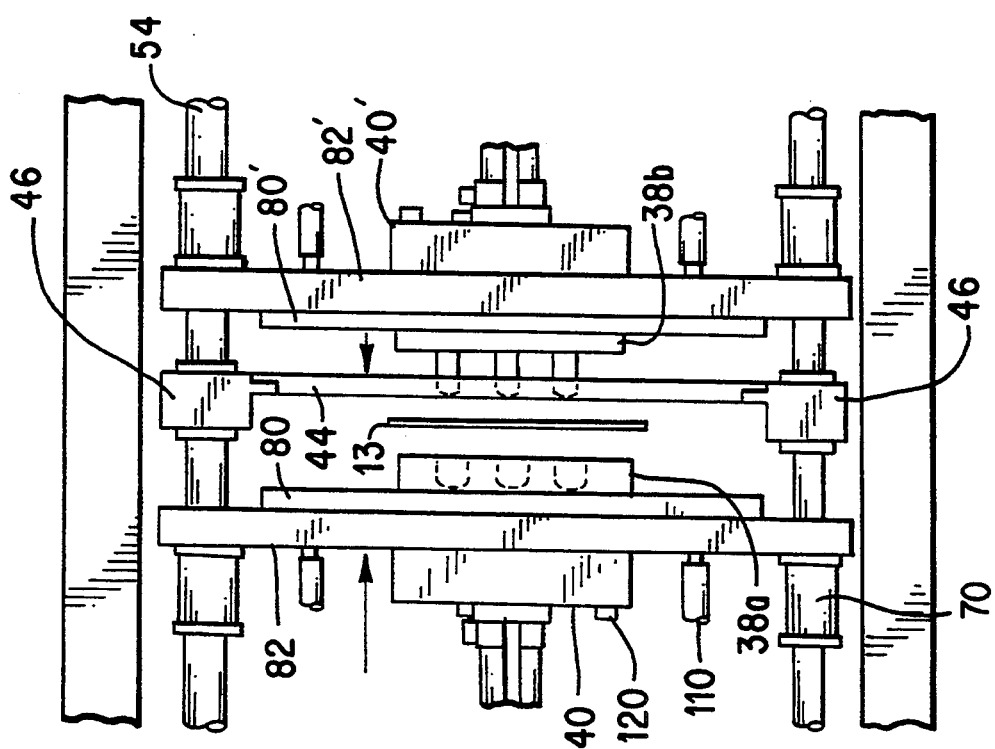
FIG. 3 is a partial plan view of the forming station in FIG. 2, showing the forming press in a first position as the plastic is being moved into the forming station.

Turning to FIGS. 2, 3, and 4, there are shown more detailed views of the forming station 18 mounted on upper frame 34 where the plastic sheet 13 is thermoformed. Specifically, FIG. 2 shows upper frame 34 of apparatus 10 mounted on lower frame 11, with plastic sheet 13 located between the mold halves 38a and 38b as it is thermoformed in the forming station 18. The opposite sides of the forming press station 18 and the mold halves 38a and 38b can be adjusted relative to one another by movement along tie rods 54. Tie rods 54, along which the moving parts of the forming station 18 may slide, are mounted to upper frame 34 by plate anchors 50. Tie rod bolts 74 and plate anchor bolts 108 secure tie rod 54 to plate anchor 50, and plate anchor 50 to frame 34, respectively. Hand wheels 58 are used to adjust the positions of the male and female mold portions relative to one another. The stroke of the press can be adjusted by turning the hand wheels 58. When the desired position is obtained, the shaft locks 52 and 52' and hexnut 59 and 59' are tightened to maintain position.

The components of the forming press station 18 which are mounted on tie rods 54 include two oppositely disposed platens 2 and 2', oppositely disposed mold plates 38a and 38b, one being a male forming tool or mold portion, while the other is a female forming tool or cavity portion. Primary manifolds 40 and 40', tooling platter 82 and 82', mold clamp means 44 and a clamp retainer 46 are also mounted on rods 54. The components are sandwiched together in a molding position and maintained in their relationship in molding and open position by tie rod bushings 70 and 70' on the outside of the platens 2, and clamp ring bushings 72 and 72' located between platens, as shown in FIGS. 2, 3 and 4. The center line of the forming station along which plastic sheet 13 is pulled upwardly in a vertical movement is generally to the left of the mold clamping means 44 as shown in FIG. 2. The mold halves 38a and 38b of the forming station 18 are pushed toward and firmly drawn away from each other during this cycle of operation of the apparatus. The means to move the mold halves are hydraulic piston means which are generally shown at 56 and 56'. A hydraulic cylinder of common manufacture that may be activated relatively quickly to reciprocate in opposite directions has the advantage of maintaining constant hydraulic pressure on the mold in a closed position. Alternatively, mechanical means including a servo motor and ballscrew can be used to move the mold halves.

The mechanics of the actual press forming station 18 can be seen more clearly in FIGS. 3, 4 and 5. The forming station 18 is shown in its open position in FIGS. 3 and 5a. As shown in 5a, when a formed part 14 is withdrawn from station 18 by indexer 26a, a heated, but unformed portion of plastic sheet 13 is simultaneously moved upwardly into position by indexer 26 to allow a new portion of sheet 13 to be molded, as shown in 5b. When the heated plastic sheen 13 is moved into position, the left-hand side of the forming press containing the female mold 38a is moved into position against the left-hand face of the heated sheet 13. The mold clamp means 44, which is held by retainers 46, moves along tie rods against the right hand face of heated sheet 13 so that it presses sheet 13 against platen face of mold 38a to form a border around the cavity or forming tool 15 in the mold 38a. It is desirable that the outline of the clamp means 44 fits around the areas to be molded as closely as possible to avoid material waste.

As an alternative, clamp means 44 may be held in a stationary position, and the desired mold half moved against it to squeeze sheet 13 there between. It has also been found that a resilient sealing ring 45, made from a material such as rubber, when placed around the mold cavity in a geometry corresponding to the clamp means 44 as shown in FIG. 6 will provide a better seal for clamp means over the sheet. When clamp means 44 has been moved into place so as to contact plastic sheet 13 as shown in FIG. 4 and 5c, it acts to secure sheet 13 against the female side 38a of the mold in such a manner that each area of the sheet 13 which is to be molded is individually secured around its borders and isolated from the areas of sheet 13 directed to other mold cavities. This is a key feature of the present invention, as prior art thermoforming machines secured the plastic sheet only at its outside edges or perimeter allowing various internal areas of the sheet to interact as they were being thermoformed and yielding a less precise and lower-quality finished product than is available using the present invention. After being secured as described above, sheet 13 is drawn by male plate tooling 38b which closes in on the female platen 38a by being moved along tie rods 54 as shown in FIGS. 2 and 5d. As noted above and as shown in FIG. 2, plug assists 39 may be used to provide a more uniform molded part.

Figure 7:
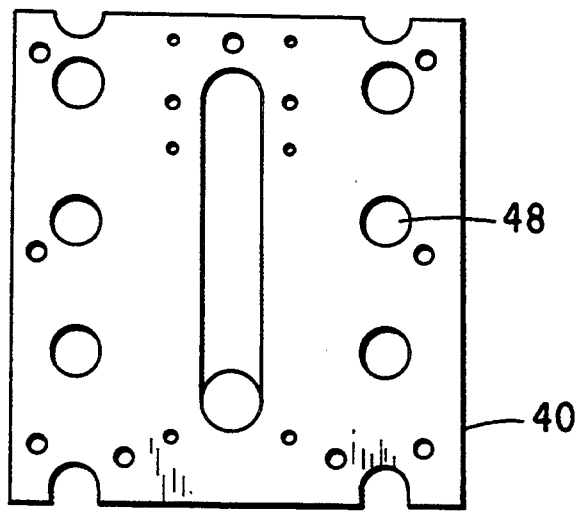
FIG. 7 shows a front elevational view of the mounting platen used in connection with the mounting of molds.
Figure 8:
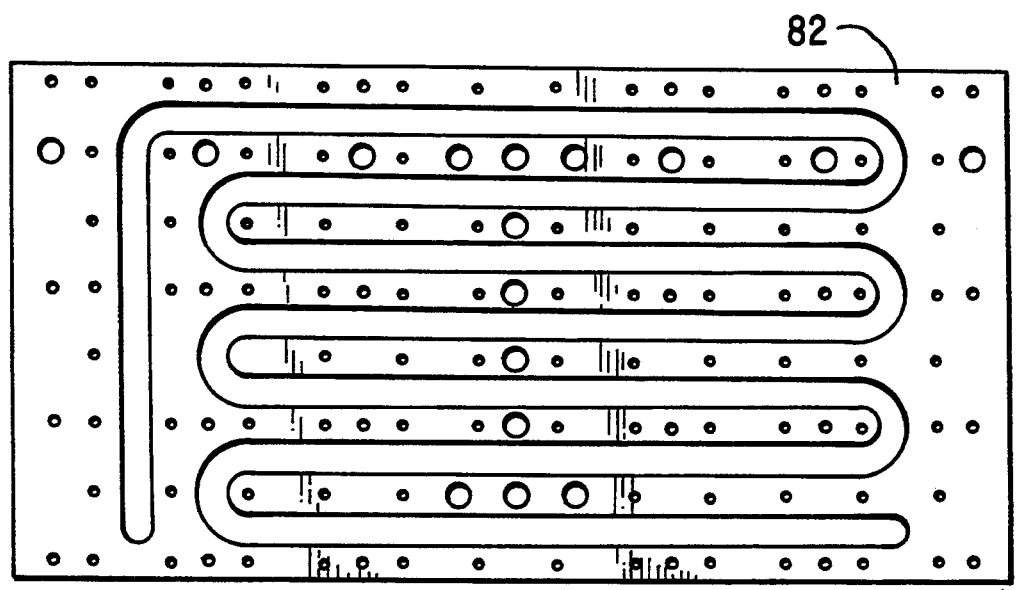
FIG. 8 shows an elevational view of the cooling platen with means for circulating liquid in order to cool the formed part.

The unique construction of the molds shown in FIGS. 2, 3, 4 and 5 allows use of vacuum and air pressure to assist in the molding operation to achieve a better quality product more rapidly. Vacuum is applied through lines 120 to evacuate the cavity 15 as the plastic is drawn into mold 38a. Positive air pressure is applied through line 120' and manifold 40' into mold 38' to assist in drawing. Upon formation, the valves (not shown) to the lines 120 and 120' are reversed to reverse the vacuum and air pressure to opposite sides of the mold to help separate the mold halves and separate the formed plastic sheet from this mold. FIG. 7 is a cross sectional view of the manifold 40 (or 40') through which air pressure or vacuum is directed to molds 38a and 38b. The plurality of openings 48 through the manifold 40 allows more than one mold cavity to be serviced. In addition, the mold mounting means, including platen 80 and 80' and tooling plate 82 and 82', are designed to permit the circulation of cooling water throughout the process. FIG. 8 shows the path of the cooling fluid through a cutaway view of the tooling plate 82 which is connected with cooling fluid line 110. A timed slight delay is used following the molding of the thermoplastic part to allow the molded plastic sheet to be cooled sufficiently so that with the air/vacuum assist it may be withdrawn from the molds and moved out of the forming press station 18 in a rapid fashion and with no damage to the formed thermoplastic part.

Figure 11:
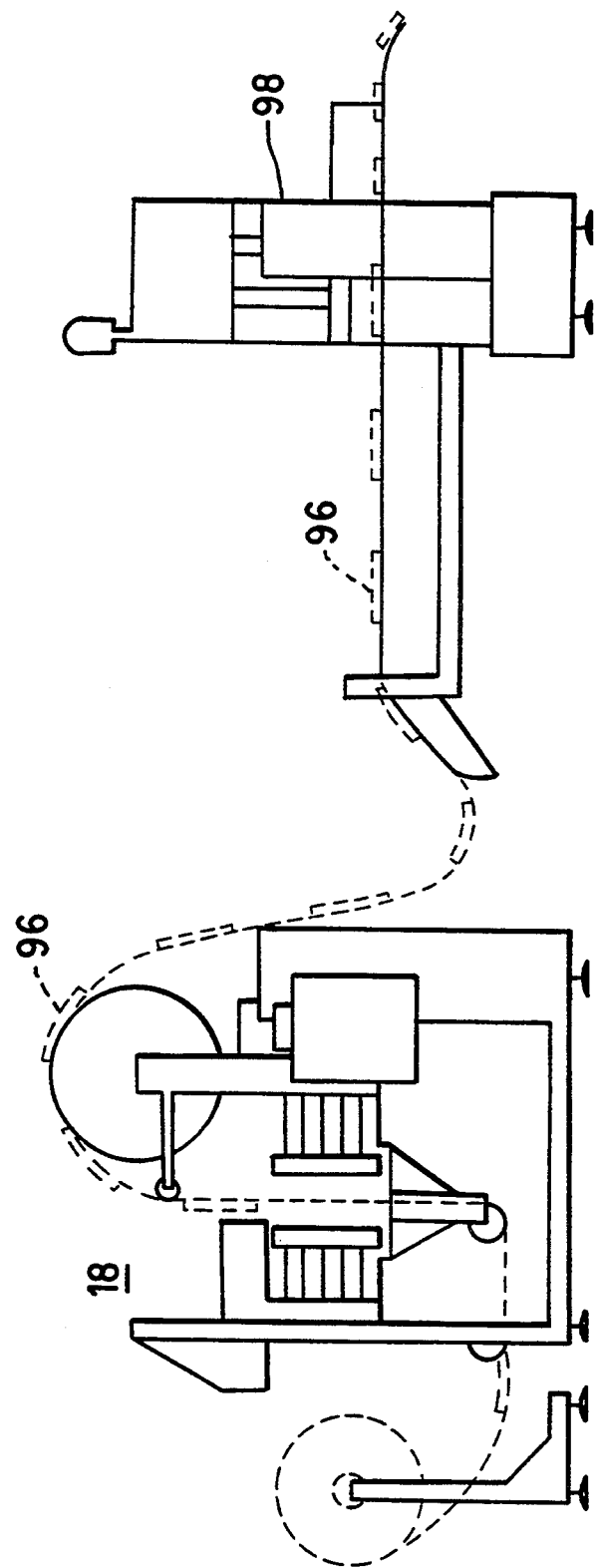
FIG. 11 is a front view of the thermoforming apparatus, including the cutting means.

In FIG. 6, there is shown a typical thermoplastic part 45 which is formed out of the plastic sheet 13 with a portion labelled "A" having been in the left-hand or female side of the mold 38a and the face labelled "B" having faced the right hand or male side of the mold 38b. The clamping means 44 is shown as divided into three areas corresponding to the cavities 15 in mold 38a and would clamp the mold 38a generally along the borders labelled "C" on the flanges of the part 45. A rubber sealing ring may be placed about the borders of each cavity to promote a better seal between the mold face sheet and clamp. FIGS. 7, 8 and 9 show the platens 80 and 80', primary manifolds 40 and 40' and the tooling plates 82 and 82' These elements are the same on the right-hand side of the forming station 18 as on the left-hand side. The primary manifold 40 is attached to the platen 80 and has openings formed therein to allow the passage of air and the evacuation of air from mold 30 through the tooling plate 82. The vacuum and air pump means are of conventional design and may be mounted on the frame of the apparatus 10. These are activated by a suitable switching means which in turn may be controlled, as are all the timed components of the cycle, by means of a micro processor (not shown). The air which enters through the primary manifold or which is evacuated during the vacuum cycle is directed to the mold cavities and through tiny openings in the mold face to those portions where it is desired. The thermoformed parts 96 once formed are fed to the cutting station 98 as shown in FIG. 11. The cutting station 98 is independent from the forming station 18.

A specific embodiment of this invention has been described for purposes of illustrating the manner in which the invention may be made and used. It should be understood that implementation of other variations and modifications will be apparent to those skilled in the art and that the invention is not limited by the specific embodiment described, but is intended to cover any and all modifications, variations or equivalents that fall within the scope of the underlying principals disclosed and claimed herein.

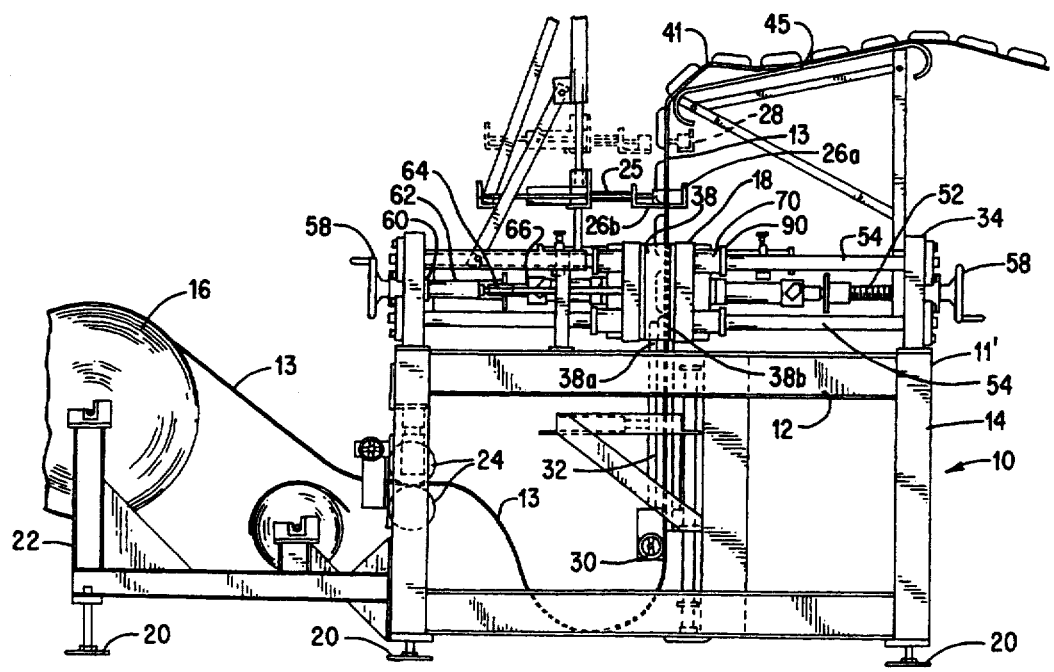

We claim:

1. An apparatus of thermoforming plastic sheet material into desired forms in a manner so as to minimize material waste and improve product quality, comprising:

a. a forming station including complementary first mold means and second mold means moveable toward and away from each other along a horizontal axis, one of said mold means having at least one forming tool therein;

b. indexer means disposed above and adjacent to said mold means for moving said plastic material into said forming station without the use of a chain rail or clamping rail running along side material vertically between said mold means such that the length of said plastic material runs on an upward path of travel from the bottom toward the top of said apparatus to eliminate sagging of said material and the need for said chain rails or said clamping rail during a molding operation; said indexer means being moveable along a vertical path in a reciprocal manner relative to said mold means;

c. means for moving said mold means adjacent one another in said molding operation with said plastic material disposed vertically there between, said mold means cooperating to form a molded article;

d. means disposed between said first mold means and said second mold means to clamp said plastic sheet material around said forming tool in one of said mold means during said molding operation to thereby isolate and individually secure around all of its borders each area of sad plastic forming tool and provide more uniform drawing of said plastic material.

2. The thermoforming apparatus of claim 1, including assist means for facilitating said molding operation and release from said mold means of said thermoformed article.

3. The apparatus of claim 2 wherein said assist means includes positive air pressure supply means directed to one of said mold means and negative air pressure supply means directed to the other of said mold means during molding, said assist means being reversibly directed to the opposite one of said mold means after molding.

4. The apparatus of claim 3 further including plug assist means mounted on one of said mold means.

5. The thermoforming apparatus of claim 1, including a frame, a plurality of generally horizontal, parallel rods mounted on said frame, first mold means and second mold means mounted on said rods for sliding movement therealong, and means for moving said first mold means and said second mold means toward and away from one another along said rods.

6. The apparatus of claim 5 wherein said means for moving said mold means includes hydraulic means.

7. The thermoforming apparatus of claim 5, wherein said means to clamp said plastic material against one of said mold means is a clamping tool which is mounted on said generally parallel rods mounted on said frame, said clamping tool having at least one opening formed therein generally corresponding in outline to said forming tool, said clamping tool when positioned adjacent said forming tool with said plastic sheet therebetween acting to prevent said plastic sheet from moving relative to said forming tool during molding to provide uniform drawing of said plastic sheet.

8. The apparatus of claim 1 wherein said means to clamp said plastic material against said mold means includes a resilient sealing means disposed on an opposite side of said plastic sheet from said means to clamp to provide better sealing between said mold means, said plastic sheet and said means to clamp.

9. The thermoforming apparatus of claim 1 wherein one of said mold means has multiple forming tools formed therein and said means to clamp has openings formed therein corresponding in shape and location to each of said forming tools.

10. The thermoforming apparatus of claim 1 including means to cool said mold means during said molding operation.

11. The thermoforming apparatus of claim 10 wherein said means to cool said molding apparatus includes a tooling plate mounted adjacent said mold means, said tooling plate having circulation passageways formed therein to receive and circulate a cooling fluid therethrough to permit the transfer of heat from said mold means to said cooling fluid.

12. The thermoforming apparatus of claim 1 including heating means disposed adjacent the upward path of travel of said plastic sheet means and operating to heat selected portions of said plastic sheet prior to molding to facilitate thermoforming of said sheet.

13. The thermoforming apparatus of claim 1 additionally including cutting means designed to cut each thermoformed part from the sheet of material fed to said cutting means.

14. The thermoforming apparatus of claim 1 wherein said indexer means includes a jaw means having a first clamping portion in a complimentary second clamping portion, said clamping portions being movable toward and away from one another along a horizontal axis, said first and second clamping portions being operable to engage opposite faces of said plastic sheet material to hold said plastic sheet in a position such that its length runs vertically from the bottom to the top of said apparatus.

15. The thermoforming apparatus of claim 14 wherein each of said first and second clamping portions include elongated edge means which are operable to grip said plastic material substantially across its width, said edge means being movable together in a vertical manner when gripping said plastic material to raise said plastic material.

16. In an apparatus for thermoforming plastic sheet material of high orientation and including frame, complimentary mold means mounted on said frame for movement relative said frame, the improvement comprising means to move said plastic material on an upward path of travel from the bottom to the top of said apparatus in a vertical manner relative to said mold means such that said plastic material remains essentially vertical at all times during molding, said means to move said plastic material comprising a pair of opposed indexing jaws mounted on said frame above said mold means and movable horizontally toward and away from one another and vertically as a pair toward and away from said mold means.

* * * * *

UNITED STATES PATENT AND TRADEMARK OFFICE
CERTIFICATE OF CORRECTION

Page 1 of 2

PATENT NO. : 5,385,465
DATED : Jan. 31, 1995
INVENTOR(S) : Daniel Greiwe et al.

It is certified that error appears in the above-identified patent and that said Letters Patent is hereby corrected as shown below:

The title page should be deleted to appear as per attached.

Signed and Sealed this

Sixteenth Day of June, 1998

Attest:

BRUCE LEHMAN

Attesting Officer    Commissioner of Patents and Trademarks

United States Patent [19]

Greiwe et al.

[11] Patent Number: 5,385,465
[45] Date of Patent: Jan. 31, 1995

[54] VERTICLE THERMOFORMING APPARATUS

[76] Inventors: Daniel Greiwe, 344 Sturges, Elmhurst, Ill. 60123; Claude Powell, Rt. 2, Box 43, New London, Mo. 63459; Greg Pranger, 16 King Arthur Ct., Apt. 7, North Lake, Ill. 60164; Claude McMahon, 210 S. Prairire, Apt. 206, New Lenox, IL 60451

[21] Appl. No.: 955,114

[22] Filed: Oct. 1, 1992

Related U.S. Application Data

[63] Continuation-in-part of Ser. No. 635,664, Dec. 28, 1990, abandoned.

[51] Int. Cl.6 .......................................... B29C 51/00
[52] U.S. Cl. .................................... 425/308; 264/550; 264/553; 425/384; 425/387.1; 425/388; 425/398; 425/437
[58] Field of Search ............... 264/549, 550, 553, 544; 425/383, 384, 385, 387.1, 388, 437, 394, 398, 289, 308

[56] References Cited

U.S. PATENT DOCUMENTS

| | | | |
|---|---|---|---|
| 2,974,366 | 3/1961 | Bauman | 264/544 |
| 3,578,735 | 5/1971 | Holmar et al. | 425/384 |
| 3,673,835 | 7/1972 | Arfert | 425/387.1 |
| 4,423,000 | 12/1983 | Teraoka | 425/388 |
| 4,592,718 | 6/1986 | Teraoka | 425/504 |
| 4,600,376 | 7/1986 | Gillman et al. | 425/388 |
| 4,804,565 | 2/1989 | Rast | 425/405.1 |
| 4,878,826 | 11/1989 | Wendt | 425/388 |
| 4,994,229 | 2/1991 | Flecknoe-Brown | 425/384 |
| 5,135,383 | 8/1992 | Marchesini | 425/387.1 |

*Primary Examiner*—Charles S. Bushey
*Attorney, Agent, or Firm*—Robert E. Brown; Thomas C. McDonough; Mark R. Galis

[57] ABSTRACT

An apparatus for thermoforming plastic sheet material which has a frame and complementary mold halves mounted on the frame for movement toward and away from one another. The apparatus has an indexing means which moves along a vertical path to pull the plastic material through the mold and a clamping means disposed between the mold halves which operates with the mold to clamp the plastic sheet around the edges of the forming tool of one mold half. The indexing means and clamping means operate to reduce sag of the plastic material and improve uniformity of the finished article. Operation of the apparatus is enhanced by the use of air pressure, vacuum and cooling during molding and release.

16 Claims, 8 Drawing Sheets